May 14, 1935.  C. J. PETRIE  2,001,109
FISH LINE FLOAT
Filed Sept. 4, 1934
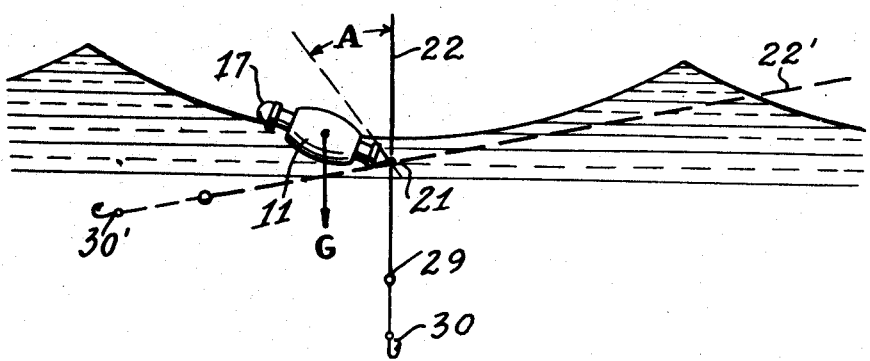
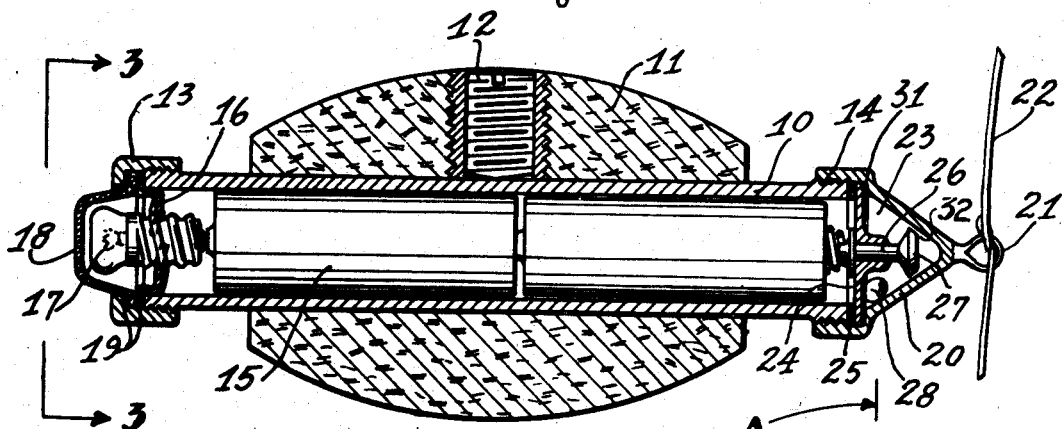
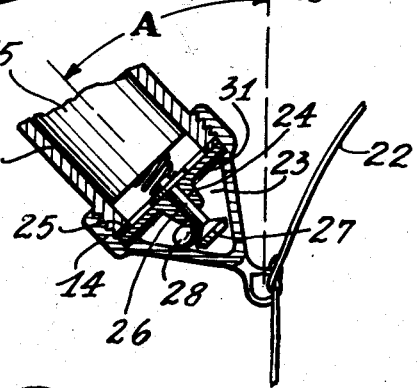
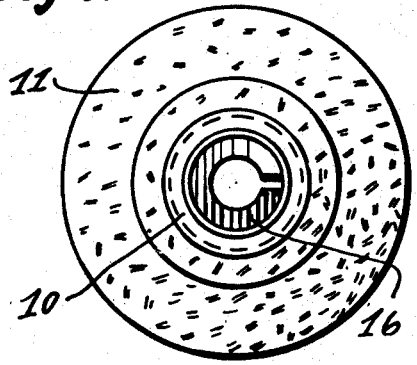
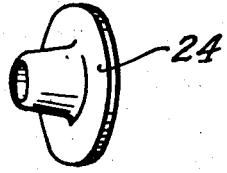
CARLTON J. PETRIE.
INVENTOR
BY *Louis Illmer,*
ATTORNEY Patented May 14, 1935

2,001,109

UNITED STATES PATENT OFFICE 2,001,109

FISH LINE FLOAT

Carlton J. Petrie, Montour Falls, N. Y.

Application September 4, 1934, Serial No. 742,548

11 Claims. (Cl. 43—17)

This invention relates to fishing tackle and more particularly pertains to an improved fish line cork or the like float medium of the bodily tiltable type that is provided with a tell-tale signal lamp and especially adapted for night fishing purposes. The major axis of my elongated float is preferably made to ride horizontally upon the water and is designed to tilt toward an upright position whenever the line lure is yanked downwardly by the hooked fish.

Said float is self-contained and its buoyancy element has a centrally disposed tube extending therethrough in which a suitable battery is housed. A simple but sensitive mercury switch of novel construction commands the current flow to my flashable electric lamp and this switch automatically closes the lamp circuit when the float is line actuated into a critical tilt with respect to its normal inoperative position.

The object of the present improvements is to devise a compact and reliable float of the character indicated that shall be capable of visually attracting attention and thereby silently notifying a night fisherman the instant that a fish takes the hook although total darkness should prevail. My float is arranged to allow for fishing in rough windy weather without functional disturbances and it may also be utilized for fishing in swift currents, likewise in trailing from the rear of a moving boat and under other service conditions.

Embodied herein are other improved constructive features designed to facilitate the economical manufacture of such floats and to otherwise render the same effective for the intended purpose.

Reference is had to the accompanying one sheet of drawings which is illustrative of a certain specific embodiment of my invention, and in which drawings:

Fig. 1 schematically represents a horizontal float operatively attached to a baited fish line.

Fig. 2 is an enlarged cross-sectional view as taken longitudinally through the major axis of my float, while Fig. 3 shows an end view thereof with the cap and bulb removed.

Fig. 4 depicts a perspective view of a flanged insulator bushing used in my device, and Fig. 5 fragmentally illustrates the operative position of my tiltable float in which the flash bulb automatically lights up when yanked downwardly by the catch.

Referring in detail to Fig. 2, my line bob may comprise a metallic tubular member 10 having an apertured egg-shaped cork or the like elongated buoyancy medium 11 shiftably disposed therearound and which tube is preferably disposed lengthwise of the major axis of such cork. A set screw 12 serves to adjustably lock said medium between the tube ends in proper balance to its associated sinker weight.

The opposite ends of said tube may be exteriorly threaded to receive an annular cap 13 and a switch socket 14 respectively. One or more small dry cells such as 15 are entered into the tube in tandem relationship so as to connect such cylindrical batteries in series, the cell casing being insulated from the tube bore in the conventional manner.

Fixedly inset into the cap end bore region of this tube, is an apertured threaded disc or split annulus 16 that is preferably embraced by a cylindrical flange and shaped to provide for an inturned thread forming portion that is axially warped into spiral formation. Entered into such single thread is the screw shank of an electric tell-tale or flash bulb 17. The crown of this fragile lamp is protectively shielded by the cover 18 which may be fabricated from celluloid or the like transparent material and equipped with an outstanding brim flange. Said brim flange circumscribes the tube axis and is tightly drawn against one tube end by the cap 13, there being packing gaskets such as 19 interposed to make a water tight joint and thereby keep the bulb shank free from moisture.

The opposite tube end is similarly closed and sealed by the interiorly threaded switch socket 14 comprising a cross-sectionally conical hood wall 20 made of metal. The convergent extremity or apex region of this inclined wall is provided with an eyelet 21 to which is pivotally attached the fish line 22 and about which point my float device is adapted to bodily tilt when in use. Said hood wall is flared radially outward from its apex to constitute a switch chamber or compartment 23. The enlarged hood end is spanned by an inset compartmental insulator flange 24 that may be centrally seated upon an annular hood shoulder, as shown. A gasket 25 again provides for a water-tight joint.

As detailed in Figs. 2 and 4, said flange preferably includes a tubular neck portion that extends laterally from one flange face and has a conductor stem 26 axially entered therethrough. One stem end carries a helical spring that resiliently contacts the battery casing. The opposite stem end overhangs into the compartment 23 and terminates in a diametrally enlarged metallic contact disc 27 of which the perimeter is kept suitably spaced from the circumscribing hood wall by the endless air gap 32. Said insulator neck is preferably extended to reach closely contiguous to such transversely disposed disc.

A globule of mercury or the like conductive pellet 28 is floatingly confined in said compartment and which pellet is allowed to travel freely along the inclined hood wall which serves as a runway for the pellet that is disposed obliquely relative to the tube axis. When the tube assumes its normal horizontal position, said mercury will by gravity be lodged toward the lowermost base or mouth region of the conical hood wall in the fashion indicated in Fig. 2 and thereby opens the lamp circuit. When however, the swinging bulb end of my tubular float is raised to come within the range of its critical angular tilt position (designated as A in Fig. 5), said globule will automatically roll toward the contracted nose end or apex region of the hood socket and bridgingly establish an electric contact between the disc 27 and the conical wall 20. As a result, the flash lamp 17 will be lighted, the battery circuit therethrough then being closed through the stem 26, the pellet 28, the tube 10 and the threaded disc 16. Upon the return of the tube axis into a horizontal position, said pellet automatically breaks the circuit and thereby extinguishes said lamp. The latter condition applies whenever the float lies outside of the operative tilt angle A and it will be apparent that my mercury switch is alertly responsive to a change in such angular position.

Fig. 1 indicates the preferred mode in which my elongated float may be applied to the vertically suspended fish line 22, the immersed end of such taut line being equipped with the usual sinker 29 and a baited hook 30 while the opposite line end may be pole manipulated by the angler in the customary manner. It will be observed that the center of gravity marked "G" of my float normally lies laterally of the fish line 22 and that while awaiting a bite, the tubular float axis remains in a substantially right angular relation to such baited line. An outstanding advantage of the described tiltable float resides in the wide latitude of idle movement afforded the float when subjected to choppy wave action as schematically portrayed in Fig. 1; that is to say, such offset float may throughout a wide range, freely whip or rock about its pivot toward the critical angle "A" without flashing the light. It is emphasized that my signal float is not incorporated directly into the line to constitute a length component thereof through which the hook pull or sinker load is transmitted. As a result, the cited wave action does not tend to deceivingly flash the light. Being disposed closely adjacent to the float pivotal point, the pocketed mercury pellet is not subjected to excessive whipping or continuous rolling movement while standing in its open switch position.

Since the bushing neck of the flange 24 is made to surround the stem 26, this provides insulation medially above the normal inoperative or open position of the globule 28. Hence any inordinate bouncing on the part of the globule cannot close the lamp circuit. In addition, any sudden tilting movement imparted to the float, would by centrifugal force thrust said globule radially away from the tilt fulcrum 21 and toward the pocketed compartmental flange 24.

Should an effective fish bite carry away the hook obliquely downward, then the float axis will responsively tend to align itself with such taut line until it reaches within the predetermined tilt angle A, which in turn instantly flashes the lamp 17. Said critical angle is purposely kept relatively small, say less than 45, and this lies wholly above the normal horizontal float level, the tilt disposition being such as will allow of reeling in a caught fish over a protracted time period without undue wastage of battery current.

My float is likewise adapted to function while fishing in swift flowing streams. When the float is made to trail in accordance with the dotted and dashed line 22' of Fig. 1, the tube axis still remains similarly disposed so that any corresponding heavy line drag or current drift does not affect the proper action of my switch control. It is only when the float is bodily drawn downwardly under the water surface by a catch that the free swinging end of the float is subjected to an upwardly directed movement with respect to the eyelet which in turn makes the switch operative.

When the line 22' and float are horizontally positioned as in Fig. 1, a caught fish might be expected to drag the line outwardly and downwardly away from the angler, which tilts the float through its operative critical position A and thereupon throws the float in a trailing relationship to the dragged hook.

Similar results may be had when the hook is located intermediate the float and a heavy bottom sinker. When using live bait thereon, the wide tiltable latitude given to my device is so arranged that its switch control is not likely to be actuated except by the anticipated catch. Furthermore, the disclosed switch cuts off the current flow while the angler draws in the line or otherwise delivers a fish, all of which conserves the limited life of the dry battery. In addition, the more delicate float mechanism is not subjected to line strain while landing a heavy catch or in the event the line should become snagged.

Furthermore, provision has been made to facilitate rapid assembly of the working parts. For convenient handling of the dismounted switch socket 14 while loading the tube with replacement batteries, I preferably resort to a tightly inserted retaining washer 31 made of sheet celluloid or the like, having a central hole that permits of freely removing the contact disc 27 therethrough without spilling the mercury globule. In addition, the unitary design of my float is such as to render all tube encased members waterproof and to protect the same against damage when roughly handled. The gravity actuated switch is extremely simple in structure and thoroughly reliable in operation, being practically fool-proof against inadvertent battery drain.

It is thought the foregoing rather explicit disclosure will make evident to those skilled in this art, the advantages afforded by my float appliances, it being understood that I reserve the right to modify my illustrative embodiment, all without departing from the spirit and scope of my invention heretofore disclosed and more particularly pointed out in the appended claims.

I claim:

1. The combination of a fishing line and a self-contained float cooperatively attached to the line and which float means comprise a tubular member having a buoyancy medium disposed about the tube and between the respective tube extremities, an electric lamp bulb mounted at one extremity of said tubular member, a transparent protective cover for the bulb and which cover hermetically seals the bulb therebehind, an automatic gravity actuated control switch including a hood wall and a pellet located outwardly beyond the opposite tube extremity, and a battery arranged within said tube in an operatively interposed relation between said switch and the bulb.

2. The combination of a baited fishing line and float means cooperatively attached to the line and which float means comprise a tubular member extending through said float, a shiftable buoyancy medium slidably disposed around the tube exterior, adjustable means for locking the buoyancy means to the tube, an electric flash bulb mounted at one end region of said tube, a gravity actuated control switch located at the opposite tube end region, and a battery arranged within said tube and operatively interposed between said switch and the bulb, the fish line being solely attached to the float at the aforesaid opposite tube end region and serving to automatically close said switch and thereby flash said bulb when the lure is yanked downwardly by the hooked fish.

3. The combination of a fishing line and float means cooperatively attached to the line and which float means comprise a tubular member extending through said float and having each of its opposite end regions threaded, a buoyancy medium disposed around the tube exterior, a split annulus mounted crosswise within one such tube end region and which annulus is given a spiral thread formation, an electric signal bulb including a screw shank portion entered into said annulus, a gravity actuated switch located at the opposite tube end region, a battery operatively interposed between said switch and bulb, and a packing located at each of the tube ends and which packings are separately drawn toward the medial tube region by the respective threads lying contiguous thereto.

4. The combination of a fishing line and float means cooperatively attached to the line and which float means comprise a tubular member extending therethrough, a buoyancy medium disposed about the tube and of which tube one end is threaded, an electric lamp bulb located at the opposite tube end, a switch socket engaging the threaded tube end, said socket including a conical hood wall that circumscribes the tube axis to form a switch chamber therein and the apex of which wall provides for eyelet means that constitute the sole means of attachment to the fishing line, an insulator partition bridging the divergent end region of said hood and serving to close the mouth of said chamber, conductor stem means sustained by said partition and which means carries a contact disc arranged within the closed chamber, pellet means normally confined within said chamber, and a cylindrical battery operatively interposed between said stem and the bulb.

5. The combination of a fishing line and float means cooperatively attached to the line and which means comprise a tubular member having a buoyancy medium disposed about the tube, an electric flash bulb mounted at one end region of said tubular member, a self-contained switch socket including a hollow conical hood wall that circumscribes the tube axis and the divergent mouth region of which wall is demountably attached to the opposite end of the tubular member, an apertured retaining washer inset into the aforesaid hood mouth region, a conductor stem including a contact disc entered through the apertured retaining washer, and pellet switch means arranged to roll along the wall interior and the travel of which pellet is restricted by said washer.

6. The combination of a fishing line and float means cooperatively attached to the line and which float means comprise a tubular member extending through the float and having each of its opposite end regions threaded, a buoyancy medium disposed about the tube exterior, an annulus mounted crosswise within one such tube end region and which annulus is given a spiral thread formation, an electric flash bulb including a screw shank portion entered into said annulus, a transparent protective cover for the bulb and which cover includes a brim flange, an apertured cap engaging one of the tube threads and embracing the aforesaid brim flange to hermetically seal the bulb behind the cover, an automatic control switch located at the opposite tube end, a battery operatively arranged within said tube, and eyelet means located at said opposite tube end and constituting the sole means of attachment to the fishing line.

7. The combination of a fishing line and float means cooperatively attached to the line and which float means comprise a buoyancy medium and a tubular member, an electric flash bulb located at one terminal region of the tubular member a hollow conical hood wall that is electrically conductive and circumscribes the tube axis with its divergent base region attached to the opposite terminal region of the tubular member, contact disc means spacedly mounted within the confines of the hood wall and providing for an endless air gap therebetween, pellet switch means arranged to roll along the wall interior and which pellet in one extreme of travel bridges the aforesaid gap, and a battery interposed between said contact disc and the bulb, said battery being operatively connected to light said bulb when the pellet bridges the aforesaid gap.

8. The combination of a fishing line and float means cooperatively attached to the line and which means comprise an elongated buoyancy medium adapted normally to lie lengthwise with respect to the surface of the sustaining liquid, an electric flash bulb fixedly located at one end region of said float, switch means located at the opposite end region of said float, means pivotally attaching the last named float end to the line and which means constitute the sole attachment to said line, the bulb end region of said float being kept free to angularly swing upwardly about the aforesaid pivot means into range of a predetermined critical tilt position, and a battery carried by the buoyancy medium and which battery is operatively connected to energize the bulb under command of the switch, said switch serving to automatically light the bulb whenever the float is swung within said critical tilt range and which switch extinguishes the bulb while the float remains outside of the aforesaid tilt range.

9. The combination of a taut fishing line and float means cooperatively attached to such line and which means comprise an elongated buoyancy medium, means pivotally attaching one end region of the float to said line and allowing the float to unobstructedly tilt with respect to the line axis, a battery carried by said float, a manipulative switch interposed between the pivot means and the battery, said switch including contact disc means together with a pellet arranged to roll toward or away from said disc when the float assumes different inclinations with respect to the line axis, and an electric light bulb disposed at the free swinging end region of said tiltable float and which bulb is operatively energized by the battery under command of said switch, said switch serving to automatically light the bulb whenever the pellet is brought into contact with said disc.

10. The combination of a fishing line and float means cooperatively attached to the line and which means comprise a tube having a buoyancy medium disposed therearound, an electric lamp bulb carried by one end region of the tube, a switch chamber provided with a rolling pellet carried by the opposite tube end region, an insulator partition spanning the last named tube end and which partition includes a laterally disposed bushing element extending axially into the chamber, a conductor stem entered through the bushing, a contact disc mounted upon the stem within the chamber and providing for an endless air gap around the disc perimeter, and a battery arranged within the tube and serving to energize the bulb when the pellet is rolled into contact with the disc.

11. The combination of a fish line and float means cooperatively attached to the line and which float means comprises a buoyancy medium and a tubular member having a major axis, an electric light bulb, gravity actuated switch means including a pellet and an inclined pellet runway that is disposed obliquely with respect to said axis, and a battery electrically connected to supply energizing current to the bulb and which current is placed under the command of said switch.

CARLTON J. PETRIE.